2 Sheets—Sheet 1.

C. FRANK.
COMBINED PLOW AND CULTIVATOR.

No. 179,291. Patented June 27, 1876.

WITNESSES:
F. McArdle
John Goethals

INVENTOR:
C. Frank
BY
ATTORNEYS.

N. PETERS, PHOTO-LITHOGRAPHER, WASHINGTON, D. C.

2 Sheets—Sheet 2.

C. FRANK.
COMBINED PLOW AND CULTIVATOR.

No. 179,291. Patented June 27, 1876.

WITNESSES:
Francis McArdle,
John Goethals

INVENTOR:
C. Frank
BY
ATTORNEYS.

UNITED STATES PATENT OFFICE.

CHARLES FRANK, OF FREEBURG, ILLINOIS.

IMPROVEMENT IN COMBINED PLOWS AND CULTIVATORS.

Specification forming part of Letters Patent No. 179,291, dated June 27, 1876; application filed March 6, 1876.

*To all whom it may concern:*

Figure 1:
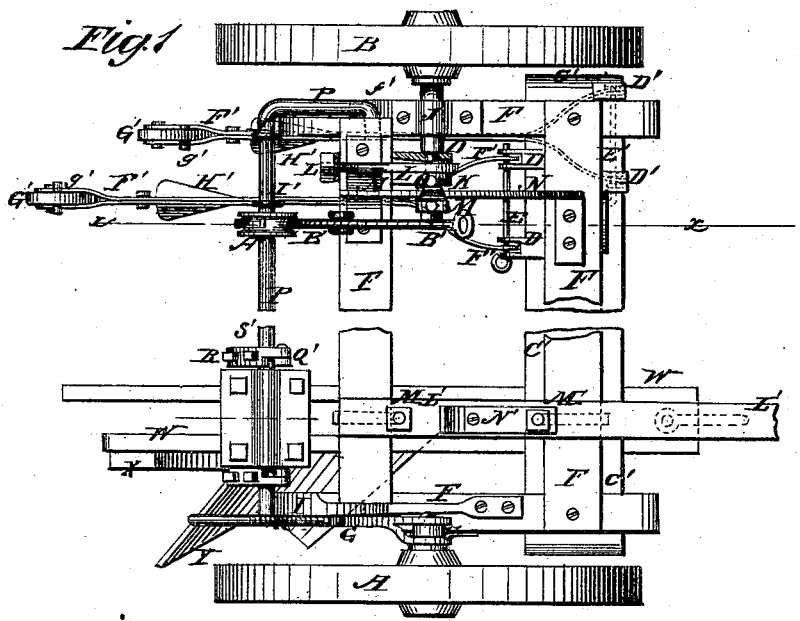
Figure 3:
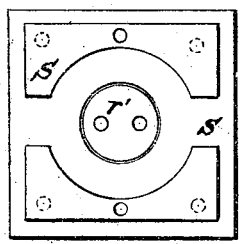
Figure 2:
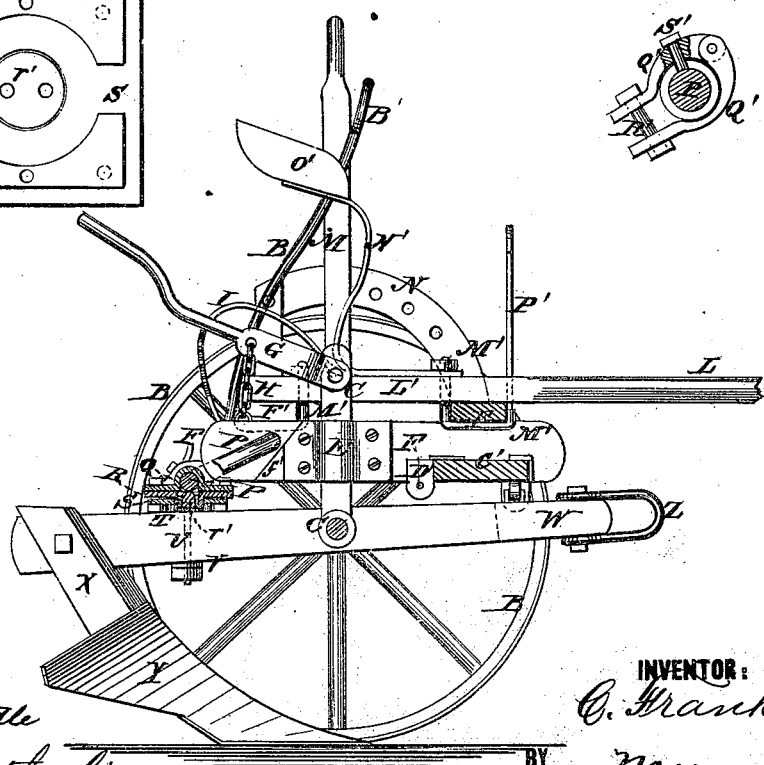
Figure 4:
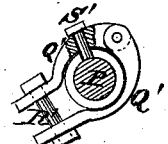
Figure 5:
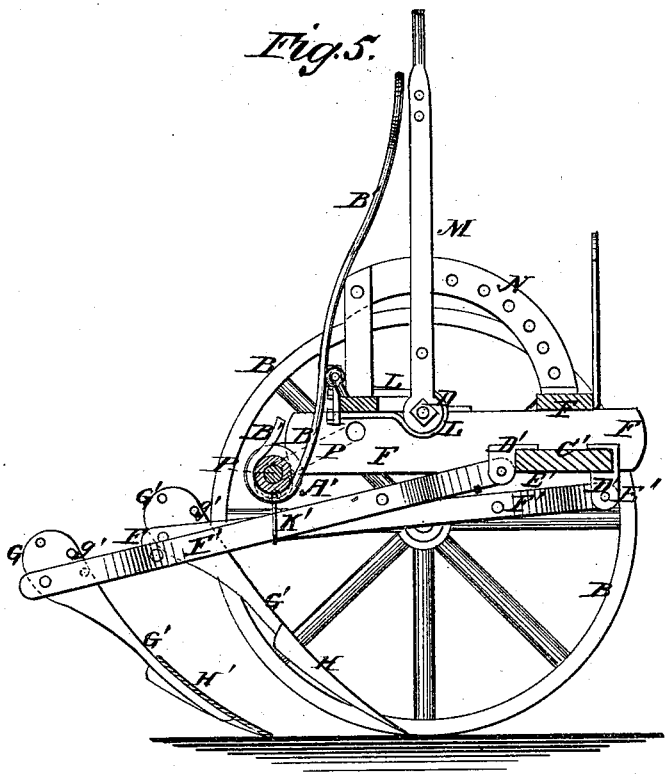
Figure 6:
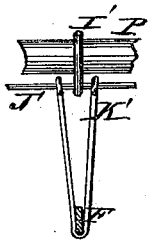

Be it known that I, CHARLES FRANK, of Freeburg, in the county of St. Clair and State of Illinois, have invented a new and useful Improvement in Plows, of which the following is a specification:

Figure 1, Sheet 1, is a top view of my improved machine, part being arranged as a plow and part as a cultivator. Fig. 2, Sheet 1, is a side view of the same arranged as a plow, one of the wheels being removed. Fig. 3, Sheet 1, is an under-side view of the device for connecting the plow with the lifting-bar, the washer being removed. Fig. 4, Sheet 1, is a detail view of the clip for securing the connecting device in place, part being broken away to show the construction. Fig. 5, Sheet 2, is a vertical section of the machine arranged as a cultivator, taken through the line $x\ x$, Fig. 1. Fig. 6, Sheet 2, is a detail view of an eye, ring, and loop attached to the lifting-bar.

Similar letters of reference indicate corresponding parts.

The object of this invention is to furnish an improved machine which shall be so constructed that it may be readily adjusted for use as a plow or as a cultivator, and which can be conveniently manipulated.

The invention will first be described in connection with drawing, and then pointed out in claims.

A B are the wheels, which are made of exactly the same size, and which revolve upon the journals of the axles C D. The axle C is bent at right axles at the inner end of its journal, and its inner part passes up vertically through a box or keeper, E, attached to the side bar of the frame F. To the end of the upright arm of the axle C is pivoted the end of the lever G, which is connected with the side bar of the frame F by a short chain, H. The lever G moves along a curved bar, I, the ends of which are attached to the side bar of the frame F, and in the edge of which are formed notches to receive the lever G, and hold it securely in any position into which it may be adjusted. The lever G, chain H, notched catch-bar I, right-angled axle C, and box or keeper E thus enable the frame F to be kept level, whether the wheel A be running upon unplowed land or in a furrow. The other axle, D, is bent twice at right angles, which gives it a crank form, and its inner arm revolves in a bearing, J, attached to the side bar of the frame F. The inner arm of the axle D has a journal of a less diameter than said arm formed upon it, which fits into and works in a bearing, K, secured to the forward side of the rear cross-bar of the frame F by a clip, L. To the end of the inner arm of the axle D is rigidly attached a lever, M, which moves along a curved bar, N, attached to the cross-bars of the frame F, and which has numerous holes formed through it to receive the hook end of the catch-lever O. The lever O is pivoted to the lever M, and its upper end is held outward by a spring pressing its hook end inward to enter the holes of the bar N. This construction, in connection with the lever G and its connections, enables the frame F to be raised and lowered, to cause the plows to work at any desired depth in the ground. P is a bar, the end parts of which are bent at right angles in the same direction, and their ends are bent inward at right angles to enter holes in the rear parts of side bars of the frame F. The arms of the bar P, when the plows are in a working position, rest upon inclined shoulders $f'$, formed upon the outer sides of the rear part of the side bars of the frame F, to prevent the said bar from turning too far beneath the said frame. Q is a plate, upon the under side of which is formed a groove to receive and fit upon the bar P, upon which it is secured by a plate, R, bolted to its lower side. Upon the lower side of the plate R is formed a cylindrical projection, $r'$, which passes through and fits into a circular hole in the plate S, placed beneath it, and secured to it by one or more bolts, which pass through holes in the plate R, and in a washer, T, placed in a recess in the lower side of the plate S. The construction allows the plate S to turn upon the projection $r'$ as a pivot, while the whole device can rack upon the bar P. The plate S is secured to the plow-beam by two bolts, U, and a yoke, V, so that the plows may be raised from the ground by raising the bar P. The coupling Q R $r'$ S T is kept in place upon the lifting-bar P by the clamps Q', which are made in two parts, hinged to each other at one end, and connected at their other ends by a bolt, R'.

The clamp Q' R' is provided with a projection or set-screw, S', which enters a groove or recess in the said lifting-bar. W are the plow-beams. X are the standards, and Y are the plows. To the forward ends of the plow-beams W are attached clevises Z, so that the draft may be applied directly to the said plow-beams, the carriage being drawn by the bar P. Upon the middle part of the bar P is placed a flanged pulley or collar, A', around which hooks a hook formed upon the rear end of the lever B'. The lever B' is pivoted to the rear cross-bar of the frame F, and its forward end projects into such a position that it may be conveniently reached and operated by the driver from his seat. To the lower sides of the forward ends of the side bars of the frame F is attached a wide cross-bar, C', to the forward and rear edges of which are securely bolted pairs of lugs D'. E are pins, each of which is made long enough to pass through a pair of lugs, D', to pivot to them the forked forward ends of the cultivator-beams F', the width of the cross-bar C' being sufficient to bring the cultivator-plows to the proper distance in advance of each other. The rear ends of the cultivator-beams are slotted or forked to receive the upper ends of the standards G'. The upper ends of the standards G' are made broad, and are pivoted at their rear parts to the ends of the beams F'. In the forward part of the upper ends of the standards G' are formed a number of holes to receive small wooden pins g', which rest upon the upper side of the beams F', to sustain the draft-strain, and which are made of such a strength as to sustain the draft under ordinary circumstances, but will break should the plows strike an obstruction, and thus prevent the plows from being broken. To the lower ends of the standards G' are attached the plows H', which are made long and narrow, and have their wings inclined to the rearward, so that they will enter and pass through the ground freely, stir the ground thoroughly, and will scour, so that the soil will not stick to them. Upon the bar P are placed rings I', which have eyes formed upon their lower sides to receive the pin J', which also passes through eyes formed upon the guide-loops K', through which the cultivator-beams F' pass.

By this construction the cultivators can be detached by withdrawing the pins E' and J', and the plows can be detached by removing the nuts of the bolts that connect the plates Q R. The tongue L' is secured to the cross-bars of the frame F by hook-bolts M', which pass through the said tongue, and hook upon the said cross-bars, so that by loosening the nuts of the said hook-bolts M' the tongue can be adjusted in the center of the machine when it is to be used as a cultivator, and moved toward the side when it is to be used as a plow. To the rear part of the tongue is attached the standard N', to the upper end of which is attached the driver's seat O'. To the forward cross-bar of the frame F is attached a hook, P', to receive and hold the lever B' when lowered to raise the plows from the ground for turning around and passing from place to place. To the upper sides of the forward ends of the plow-beams W are swiveled small caster wheels or rollers to bear against the lower side of the wide cross-bar C' and prevent friction.

Having thus described my invention, I claim as new and desire to secure by Letters Patent—

1. The inclined shoulders $f'$, formed upon the outer sides of the rear parts of the side bars of the frame F, to receive the arms of the lifting-bar P, substantially as herein shown and described.

2. The combination of the hook-bolts M' with the tongue L' and the cross-bars of the frame F, for securing the said tongue to said frame adjustably, substantially as herein shown and described.

3. The combination of the hook-lever B' and the flanged pulley or roller A' with the frame F and with the lifting-bar P, with which the plow-beams are connected, substantially as herein shown and described.

CHARLES FRANK.

Witnesses:
A. H. RAWSON,
PETER HILL.